United States Patent [19]

Collins et al.

[11] Patent Number: 4,558,377

[45] Date of Patent: Dec. 10, 1985

[54] DIGITAL TELEVISION APPARATUS

[75] Inventors: Mark C. Collins; John G. S. Ive, both of Basingstoke, England

[73] Assignee: Sony Corporation, Tokyo, Japan

[21] Appl. No.: 375,105

[22] Filed: May 5, 1982

[30] Foreign Application Priority Data

May 6, 1981 [GB] United Kingdom ............... 8113802

[51] Int. Cl.$^4$ ............................................. H04N 5/76
[52] U.S. Cl. ................................ 360/10.1; 360/10.3; 360/36.2; 358/312
[58] Field of Search .................. 360/10.1, 10.3, 36.2; 358/140, 11, 312

[56] References Cited

U.S. PATENT DOCUMENTS

| 4,280,147 | 7/1981 | Baldwin | 360/10.3 |
| 4,322,750 | 3/1982 | Lord et al. | 358/140 |
| 4,392,162 | 7/1983 | Yamamoto | 360/10.3 |

Primary Examiner—Robert L. Richardson
Attorney, Agent, or Firm—Lewis H. Eslinger; Alvin Sinderbrand

[57] ABSTRACT

Digital television apparatus comprises a field store arrangement comprising first, second and third field stores each capable of storing digital signals relating to one field of a television signal, circuit to supply a digital television signal at a variable rate to the field store arrangement, a write control device to supply the digital television signal to one or to two of the field stores for writing therein, depending on the rate of supply of the digital television signal, and a read control device to read the stored digital television signal from one or from two of the field stores, depending on the rate of supply of the television signal, no field store being written into at the same time that it is read from, and the write control device rotating the writing and reading around the field stores cyclically.

11 Claims, 13 Drawing Figures

DIGITAL TELEVISION APPARATUS

BACKGROUND OF THE INVENTION

1. Field of the Invention

This invention relates to digital television apparatus and more particularly, but not exclusively, to digital video tape recorders (DVTRs).

2. Description of the Prior Art

Recently there has been an increasing interest in the use of digital techniques for television signals. In a DVTR, an incoming television signal to be recorded is sampled, the samples are pulse code modulation coded into digital form, the resulting digital data signals are recorded on a magnetic tape and subsequently reproduced, the reproduced digital data signals are decoded, and the decoded signals are used to form an analog signal corresponding to the original television signal.

If errors occur in the handling of the digital signals, for example due to noise or tape drop-out occurring in the DVTR, the digital signals are corrupted and then the reformed analog television signal does not correspond exactly to the original analog television signal, and a resulting television picture is degraded.

There are two main approaches to dealing with errors in digital television signals. The first approach is correction, which involves the production and use of additional data signals purely for the purposes of error detection and correction, these additional data signals otherwise being redundant. While correction provides good results, it cannot generally be used as the sole means of dealing with errors, because a comprehensive correction capability would require an excessive amount of additional data which might overload the data handling paths or raise the data rate to an unacceptable level. The second approach is concealment. This comprises the replacement of corrupted data signals by data signals generated using available uncorrupted data signals. This method relies largely for accuracy on the strong correlation that exists in a television signal.

When a DVTR is reproducing in the normal reproducing mode, that is at the normal replay speed, the data is being recovered from the tape at the same overall rate that it is required for display on the television receiver. It is only necessary to provide time-base correction to synchronize the data reproduced from the tape with stable output synchronizing signals.

Increasingly, however, there is a requirement for reproduction at non-normal speeds. These are generally referred to as special reproduction modes and include still, slow motion, reverse motion and the so-called shuttle mode which comprises the whole range of speeds from fast forward to fast reverse and which is of particular utility in searching and editing. In an analog VTR, slow motion and shuttle speeds are achieved by the repetition or omission of complete fields. In slow motion the VTR uses a few selected fractions of the normal speed, while at the fast shuttle speeds the tracking system of the VTR is unable to reproduce complete fields, and noise bars appear in the reproduced television picture where mis-tracking or cross-tracking occurs.

It is hoped that these restrictions can be reduced in a DVTR, and that the application of correction and concealment techniques will further improve the quality of the reproduced television picture even in special reproduction modes.

Two possible techniques can be adopted to recover data from the tape in a DVTR when the tape moves faster or slower than the normal speed. Firstly, the rotational speed of the drum can be changed in proportion to the change in the tape speed to maintain correct tracking. A serious problem with this is that the data rate also changes proportionally and therefore it would be necessary to accommodate a very large change in the system clock pulse signals. This is difficult to achieve and also implies upper and lower speed limits. Secondly, the rotational speed of the drum can be maintained constant and only the tape speed changed. Inevitably mis-tracking will occur, at least at some speeds, but as much data as possible is recovered. The handling of this reproduced data, relating as it does to parts of fields and containing noise and errors, as well as needing possibly very substantial time-base correction, is troublesome, and it is with these particular problems that the present invention is particularly concerned.

SUMMARY OF THE INVENTION

One object of the present invention is to provide digital television apparatus in which these problems are at least partly overcome.

Another object of the present invention is to provide digital television apparatus comprising a field store arrangement in which a reproduced digital television signal can be written for assemblying a more complete field.

Another object of the present invention is to provide digital television apparatus comprising a plurality of field stores into which a reproduced digital television signal can be written and from which the digital television signal can be read, the writing and reading cycling around the field stores in a manner dependent on the reproducing mode, and in particular on the replay speed, of the digital television signal.

According to the present invention there is provided digital television apparatus comprising:

a field store arrangement comprising first, second and third field stores each capable of storing digital signals relating to one field of a television signal;

means to supply a digital television signal at a variable rate to the field store arrangement;

means to supply the digital television signal to one or to two of the field stores for writing therein, depending on the rate of supply of the digital television signal;

means to read the stored digital television signal from one or from two of the field stores, depending on the rate of supply of the television signal, no field store being written into at the same time that it is read from; and means to rotate the writing and reading around the field stores cyclically.

Generally the means to supply the digital television signal will be a DVTR having a normal reproduction mode corresponding to normal motion reproduction of a recorded digital television signal and special reproduction modes corresponding to still and slow motion and fast motion reproduction of a recorded digital television signal. The digital television signal is read from the field store arrangement at a rate suitable for reproduction on a television receiver, so giving the required normal, still, slow or fast motion.

Preferably, in the normal reproduction mode of the video tape recorder, the digital television signal is written into two field stores while being read from one field store, in slow motion reproduction modes of the video tape recorders the digital television signal is written into one field store while being read from one field store, and in fast motion reproduction modes of the video tape recorder, the digital television signal is written into one field store while being read from two field stores.

According to the present invention there is also provided digital television apparatus comprising:

a field store arrangement comprising first and second field stores each capable of storing digital signals relating to one field of a television signal;

means to supply a digital television signal at a variable rate to the field store arrangement;

means to supply the digital television signal to either of the field stores for writing therein;

means to read the store digital television signal from either of the field stores;

neither field store being written into at the same time that it is read from; and means to alternate the writing and reading between the field stores.

The field store arrangement can effect vertical parity correction, perform all time-base correction, and also effect data de-shuffling.

The above, and other objects, features and advantages of this invention will be apparent from the following detailed description of illustrative embodiments which is to be read in connection with the accompanying drawings.

BREIF DESCRIPTION OF THE DRAWINGS

DESCRIPTION OF THE PREFERRED EMBODIMENTS

Figure 1:
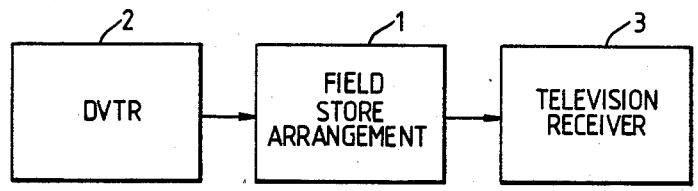
FIG. 1 is a very much simplified block diagram of an embodiment of digital television apparatus according to the invention.

Referring to FIG. 1, the central part of the digital television apparatus to be described is a field store arrangement 1 which forms a buffer store between a DVTR 2 and a television receiver 3 on which a television picture derived from a television signal reproduced from the DVTR 2 is to be displayed. The DVTR 2 has a normal reproduction mode corresponding to normal motion reproduction and special reproduction modes corresponding to slow (which includes still) motion and fast motion. In the normal reproduction mode, the data is being recovered from the magnetic tape in the DVTR 2 at the same overall rate; that is at the same rate apart only from time-base fluctuations, as required for display on the television picture.

Figure 2:
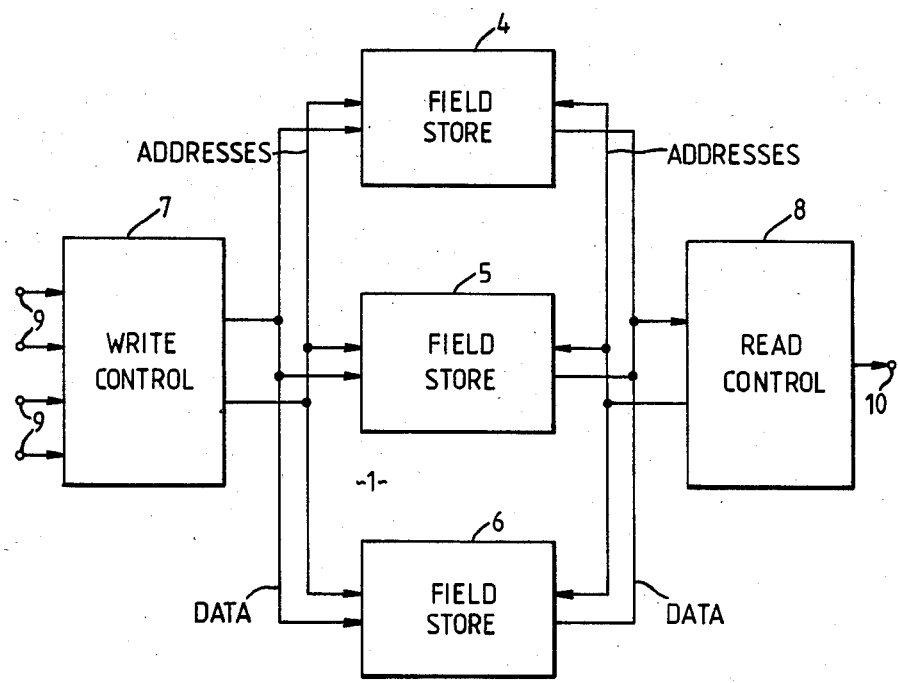
FIG. 2 is a block diagram showing in more detail a field store arrangement forming part of the apparatus of FIG. 1.

Referring to FIG. 2, this shows the field store arrangement 1 in more detail. The field store arrangement 1 comprises three field stores 4, 5 and 6, a write control device 7 and a read control device 8. Inputs 9 connected to the DVTR 2 (FIG. 1) are also connected to the write control device 7 which supplies addresses and data over separate paths to each of the field stores 4, 5 and 6.

The field stores 4, 5 and 6 are identical and each is capable of storing digital signals relating to one field of a television signal. For PAL systems, assuming 300 active lines, 1536 samples per line, and each sample pulse code modulation coded to form an 8-bit word, this means that each field store 4, 5 and 6 must be capable of storing at least 3.7 million bits. The field stores 4, 5 and 6 can conveniently be formed of 64k random access memories (RAMs) and in one example of the field store arrangement 1 each field store 4, 5 and 6 comprises 64 such RAMs. A further 8 such RAMs are required for a ninth bit of each word, this bit forming an error flag and being referred to in more detail below.

The read control device 8 supplies addresses to and receives data from each of the field stores 4, 5 and 6 over separate paths, and output data are supplied by the read control device 8 to an output 10 which is connected to the television receiver 3 (FIG. 1).

Before considering the operation in detail it must be realised that it is not possible to display more data than is satisfactorily recovered at high speeds, and that at low speeds it must be possible to use data repeatedly. At non-normal tape speeds, the format of the data from the tape and the data sequence may be widely different from normal, and this of itself dictates the need for some form of buffer storage to assemble the data and to ensure the conceptual view that is expected. What this latter means is that on display on the television receiver 3 (FIG. 1) of certain actions, such as a person walking, the viewer has a mental conception of what the action should look like and although on reproduction the action may be speeded up or slowed down, the action should still conform to the viewer's conception of it.

In the field store arrangement 1, the read control device 8 will continue to read from one field store 4, 5 or 6 until all the data in that field store 4, 5 or 6 has been read and only then will it switch to another field store. The use of three field stores 4, 5 and 6 makes it unnecessary to write into and read from the same field store at the same time, despite different reproduction speeds and time-base errors of the reproduced data. Moreover, the use of the three field stores 4, 5 and 6 avoids clashes between requirements to write into and read from the same field store, produces pictures which are conceptually better, and saves a considerable amount of hardware elsewhere in the reproduction system.

The writing and reading operations associated with the field store arrangement 1 will now be further described with reference to FIGS. 3 to 5.

Figure 3A:
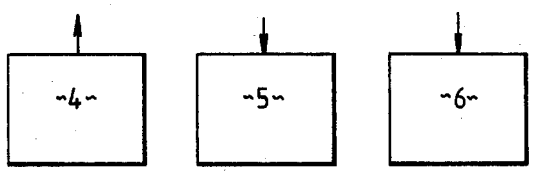
FIGS. 3A and 3B illustrate diagrammatically the operation of the field store arrangement of FIG. 2 in a normal reproduction mode.
Figure 3B:
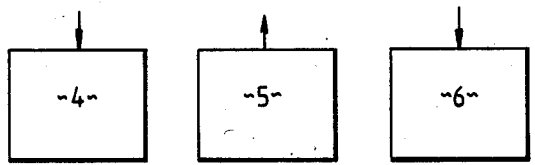

The normal reproduction mode will be described first. As indicated in FIG. 3A, data is first read from the field store 4 while being written into the field stores 5 and 6 simultaneously. When all the data has been read from the field store 4, data is read from the field store 5 while being written into the field stores 6 and 4 simultaneously, as indicated in FIG. 3B. Reading and writing continues to rotate around the field stores 4, 5 and 6 cyclically in this way.

Writing into the field stores 4, 5 and 6 is synchronous with the read side field synchronizing signals. Moreover, data which is recognized to be in error is not written into the field stores 4, 5 and 6, so that the existing data is left intact. This means that when the data comes to be read it will consist of correct data from the current field and data from the previous field in the place of any errors. This improves the concealment possibilities considerably by making data available in the correct physical position, but temporally displaced from the current data.

Figure 4A:
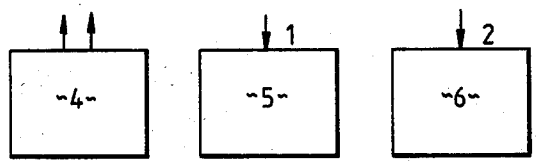
FIGS. 4A and 4B illustrate diagrammatically the operation of the field store arrangement of FIG. 2 in a slow motion reproduction mode.
Figure 4B:
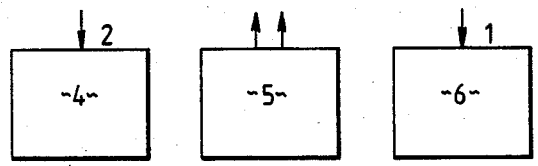

The slow motion reproduction mode will be described next. This covers speeds from zero to plus or minus the normal reproduction speed. As indicated in FIG. 4A, data is read from the field store 4 repeatedly while data is being written into the field store 5. When the field store 5 is full, writing continues in the field store 6. Then, when reading of a field from the field store 4 is next completed, reading moves to the field store 5, as indicated in FIG. 4B. This makes the field store 4 available to be written in as soon as the field store 6 is full. Reading and writing continues to rotate around the field stores 4, 5 and 6 cyclically in this way.

Figure 5A:
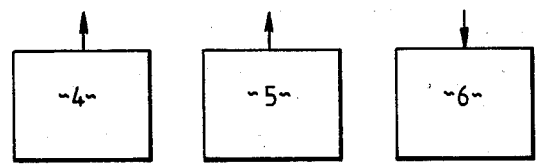
FIGS. 5A and 5B illustrate diagrammatically the operation of the field store arrangement of FIG. 2 in a fast motion reproduction mode.
Figure 5B:
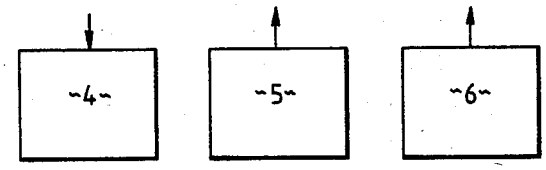

Finally, the fast motion reproduction mode will be described. As indicated in FIG. 5A, data is read from the field stores 4 and 5, while being written into the field store 6. When a complete field has been read, the reading switches to the field stores 5 and 6, while the field store 4 is written into, as indicated in FIG. 5B. Reading and writing continues to rotate around the field stores 4, 5 and 6 cyclically in this way. Because reading is from two field stores simultaneously in this mode, the read control device 8 (FIG. 2) is receiving two data streams simultaneously. However, both these data streams will be to some extent imperfect, particularly at higher tape speeds where mis-tracking of the magnetic reading heads relative to the magnetic tape will become more severe, and where cross-tracking will occur more frequently. The data which is actually used is derived by a combination of selection from and concealment using the two data streams.

In all three of these modes the writing of data into the field store arrangement 1 will be totally asynchronous with the reading out of the data, and this facilitates time-base correction.

Vertical parity correction is effected in the normal and slow motion reproduction modes, but not in the fast mode reproduction mode, because data from several different fields will be stored in the same field store. Concealment is effected using data from the current and previous fields.

Figure 6:
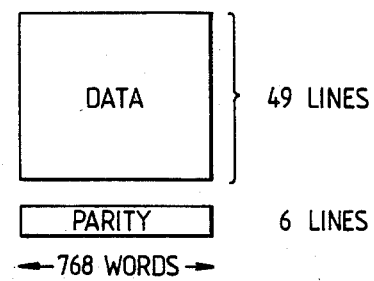
FIG. 6 illustrates a vertical parity format.

The way in which the vertical parity is applied is not critical, and one possible format is indicated in FIG. 6. In this format, the basic block of data to which the vertical parity is applied is one half of each of 49 successive horizontal scan lines. Thus one block comprises 49 times the first 768 samples in each scan line and another block comprises 49 times the latter 768 samples in each line scan. In each block the words in corresponding vertical positions are modulo-2 summed to form six vertical partiy words for each such column. Each block therefore has associated with it 6 times 768 vertical parity words.

Figure 7:
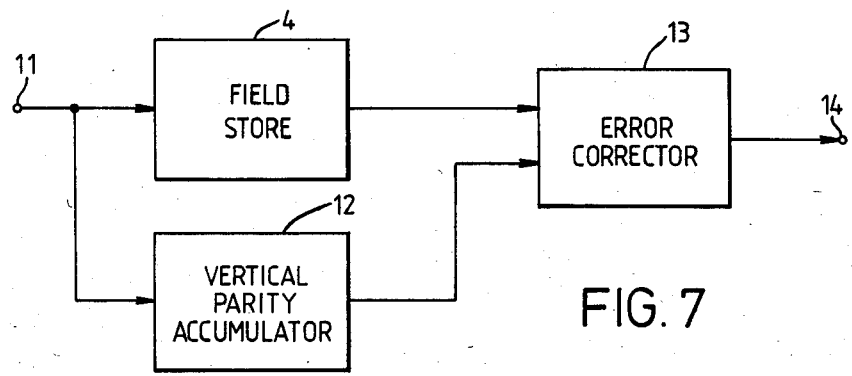
FIG. 7 is a block diagram showing in more detail part of the field store arrangement of FIG. 2.

Referring to FIG. 7, as data from an input 11 is written into, for example, the field store 4, the vertical parity information is accumulated in a separate vertical parity accumulator 12, which also counts the correct words. When reading from the field store 4, the vertical parity information is also read, and error correction is performed by an error corrector 13 if and when possible, before the data passes to an output 14. The correction system must be able to accept data out of sequence and to use correct data where possible. As mentioned, the vertical parity accumulator 12 counts the correct words in the vertical parity block, and this count is amended if an erroneous block is subsequently recovered correctly.

Further correction techniques may also be used, but for brevity will only be mentioned very briefly. Thus, although the initial pulse code modulation of the samples is into 8-bit words, it will be usual for these 8-bit words to be converted to 10-bit words for recording. This is a known technique for increasing the number of transients, and so making the signals better for magnetic recording and reproduction, by using only words consisting of at least approximately equal numbers of "0"s and "1"s. This also makes clock recovery on reproduction easier and provides for some measure of error detection on reproduction. In general too the natural order of the samples along each horizontal scan line will be shuffled prior to recording and de-shuffled after reproduction. This is because burst errors tend to be more common than individual errors, and since concealment techniques generally rely for their effectiveness in correcting error samples on there being adjacent samples which are not in error, a burst error affecting a sequence of samples along a scan line can be difficult to conceal. However, by shuffling and de-shuffling the natural order of the samples, the error samples resulting from a burst error can be distributed over a whole scan line or even a whole block of scan lines, so that they are each much more likely to be surrounded by correct samples.

After correction, concealment is effected. The concealment technique is generally as described in U.S. Pat. No. 4,419,693, issued Dec. 6, 1983. Briefly, the technique is as follows.

Figure 8:
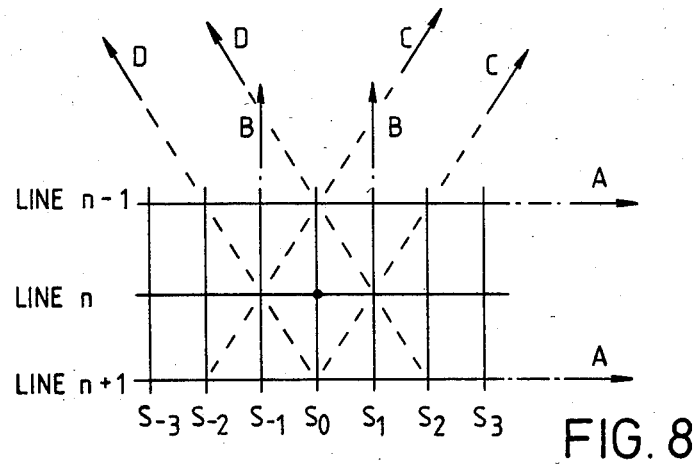
FIG. 8 shows a matrix of sample positions in a television raster.

Referring to FIG. 8, this shows part of a television raster, and in particular part of three consecutive horizontal scan lines labelled line n−1, line n, and line n+1. The sample positions are disposed at regular intervals along each of these scan lines, the intervals corresponding to the sampling frequency, and the sample positions being aligned in the vertical direction. Reading from the left, consecutive sample positions in each line are labelled S-3,S-2,S-1,S0,S1,S2 and S3. Using this notation, any sample position in the matrix can be designated by the line and the sample number, and for purposes of this discussion it is assumed that the sample position at which there is an error sample signal requiring concealment is in line n at position S0, this being designated n,S0.

Consideration of FIG. 8 will indicate that a corrected value for the sample position n,S0 could be estimated in one of four different ways. Firstly, the average could be taken of the two samples in line n adjacent to and on each side of the sample position n,S0. Secondly, the average could be taken of the two sample values in line n−1 and line n+1 adjacent to and vertically above and below the sample position n,S0. Thirdly, the average could be taken of the two sample values in line n−1 and line n+1 and on either side of the sample position n,S0 along the positive diagonal direction. Fourthly, the average could be taken of the two sample values in line n−1 and line n+1 adjacent to and on either side of the sample position n, S0 and along the negative diagonal direction. These four directions are indicated by the arrows A,B,C and D respectively.

Each of these possibilities may be thought of as an algorithm for calculating a corrected value, and it will be appreciated that it is likely that one of these algorithms will give a better result than any of the others. The preferred algorithm to be used is therefore selected by testing each algorithm using known sample values to see which gives the best result. For example, the first possibility mentioned above can be tested by using the sample values at the sample positions (n−1),S−1 and (n−1),S1 to calculate the value at the sample position (n−1),S0. As the value at this latter position is known, this provides a check on the accuracy of that algorithm when used for that particular television signal at that particular position. Likewise, a similar check can be carried out using the same algorithm in respect of the line n+1. Likewise, similar checks can be carried out using the other three algorithms, and the algorithm giving the best result is selected.

As a further refinement, the results derived from the respective algorithms can be weighted. In other words, a value can be placed on the likely accuracy of the results obtained. This is necessary because the distance between adjacent sample positions is less in the horizontal direction than in the vertical direction, the difference amounting to a factor of approximately 1.625. For this reason, the algorithm using the horizontal direction is in fact most likely to give the nearest result, with the algorithm for the vertical direction being next best, and the two algorithms for the diagonal directions being the next best.

The four algorithms referred to above will now be specified in mathematical terms. Thus, the decision of concealment direction is made by investigating the adjacent sample values and obtaining the concealment accuracy for each direction. If the concealment accuracy is H for the horizontal direction, V for the vertical direction, D+ for the positive diagonal direction and D− for the negative diagonal direction, then these concealment accuracies can be defined as follows:

$$H = \tfrac{1}{2} | \tfrac{1}{2}[(n-1),S-1+(n-1),S+1] - (n-1),S0 | + \tfrac{1}{2} | \tfrac{1}{2}[(n+1),S-1+(n+1),S+1] - (n+1),S0 | \quad (1)$$

that is to say, the concealment accuracy H equals the average of the horizontal concealment accuracy from the horizontal line immediately above and the horizontal line immediately below the horizontal line containing the error sample. Likewise:

$$V = \tfrac{1}{2} | \tfrac{1}{2}[(n-1),S-1+(n+1),S-1] - n,S-1 | + \tfrac{1}{2} | \tfrac{1}{2}[(n-1),S1+(n+1),S1] - n,S1 | \quad (2)$$

$$D^+ = \tfrac{1}{2} | \tfrac{1}{2}[(n-1),S-2+(n+1),S0] - n,S-1 | + \tfrac{1}{2} | \tfrac{1}{2}[(n-1),S0+(n+1),S2] - n,S1 | \quad (3)$$

$$D^- = \tfrac{1}{2} | \tfrac{1}{2}[(n-1),S0+(n+1),S-2] - n,S-1 | + \tfrac{1}{2} | \tfrac{1}{2}[(n-1),S2+(n+1),S0] - n,S1 | \quad (4)$$

These four values H, V, D+ and D− represent the accuracy of concealment for the sample values most closely connected with the error sample. Preferably these values are each assigned a weighting coefficient to take account of the unequal spacings of the horizontal, vertical and diagonal samples. The smallest value is then used to select the direction of concealment.

Although it is assumed that only the next adjacent samples are used for forming the calculated values, this is not necessarily the case, and there may be instances where it is desirable to extend the averaging to take in further samples successively spaced along the various directions.

The precise way in which this concealment technique is applied depends on the reproduction mode in use and is described below. In all cases the presence of an error in a word is indicated by flagging that word with a ninth bit and moreover known erroneous data is not written into the field store arrangement 1 (FIG. 1). As data is read from the field store arrangement 1 a read/modify/write cycle is used to set the error flag, so that when next read, the data will be known to be non-current or in error if it has not been updated.

Concealment operates as follows. In this mode a single stream of partly corrected data will be received. Those words not corrected will be flagged and the data itself will be from the previous field. The two-dimensional adaptive concealment will be performed on all flagged samples, but all such samples will be considered valid for the concealment and adaptive algorithns. The effect of this will be to involve samples from the current and previous fields in the concealment and some degree of interpolation will therefore result. The consealment will also have a complete selection of samples to work with at all times.

Figure 9:
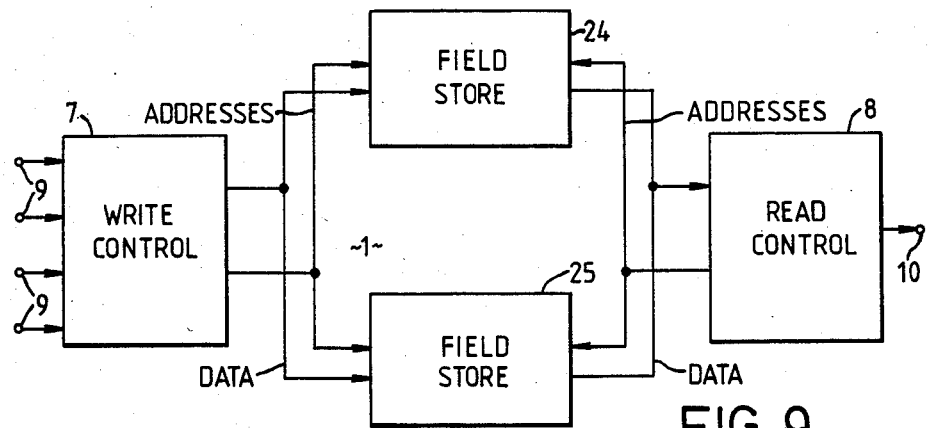
FIG. 9 is a block diagram showing in more detail a first modified field store arrangement forming part of the apparatus of FIG. 1.

Various modifications are of course possible. For example, in some situations the field store arrangement 1 of the apparatus of FIG. 1 may comprise two field stores 24 and 25 as shown in the modified field store arrangement 1 of FIG. 9. Such a field store arrangement 1 has the advantage that the amount of hardware required is reduced, but there is the disadvantage that if vertical parity correction is to be retained in the slow motion reproduction mode, then the only reproduction speeds that can be used are those in which the speed is a whole number fraction, that is ½, ⅓, ¼ etc., the normal reproduction speed.

Figure 10:
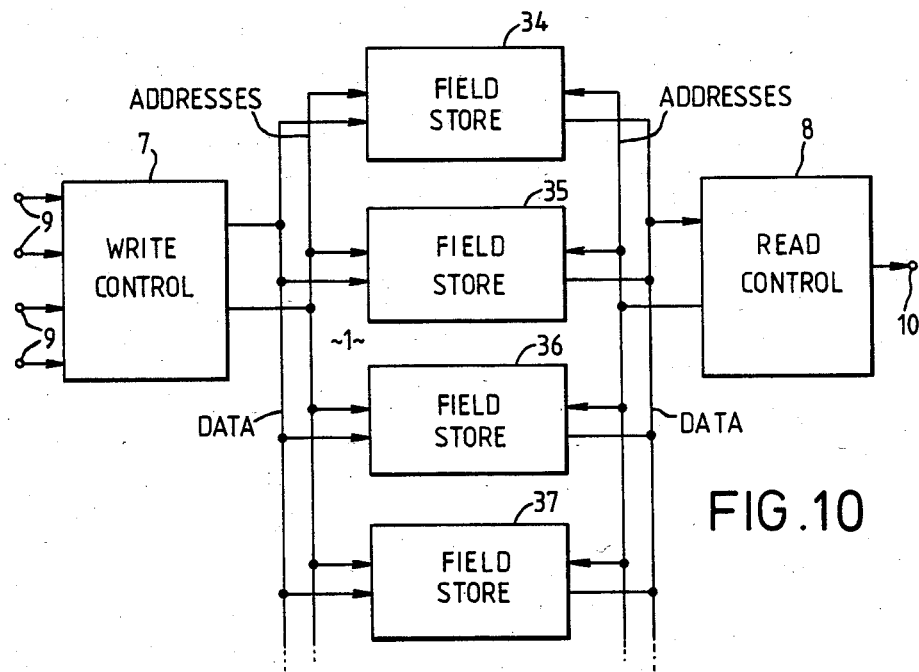
FIG. 10 is a block diagram showing in more detail a second modified field store arrangement forming part of the apparatus of FIG. 1.

Similarly, in some situations the field store arrangement 1 of the apparatus of FIG. 1 may comprise more than three field stores 34, 35, 36, 37 etc. as shown in the modified field store arrangement 1 of FIG. 10.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Digital television apparatus comprising:
    a field store arrangement comprising at least first, second and third field stores each for storing digital signals relating to one field of a television signal;
    means for supplying a digital television signal at a variable rate to said field store arrangement;
    means for supplying said digital television signal to at least one of said field stores for writing therein, the number of said field stores being written therein depending on said rate of supply of said digital television signal;

for reading signal from at least one of said field stores, the number of said field stores being read therefrom depending on said rate of supply of said television signal, with no said field store being written into at the same time that it is read from; and means for cyclically writing to and reading from said field stores.

2. Apparatus according to claim 1; wherein said means for supplying said digital television signal is a digital video tape recorder having a normal reproduction mode corresponding to normal motion reproduction of a recorded digital television signal and special reproduction modes corresponding to slow motion and fast motion reproduction of a recorded digital television signal, and wherein said stored digital television signal is read from said field store arrangement at a rate suitable for reproduction on a television receiver.

3. Apparatus according to claim 2; wherein in said normal reproduction mode of said video tape recorder said digital television signal is written into two of said field stores while being read from one of said field stores, and wherein in said slow motion reproduction modes of said video tape recorder said digital television signal is written into one of said field stores while being read from one of said field stores and wherein in said fast motion reproduction modes of said video tape recorder said digital television signal is written into one of said field stores while being read from two of said field stores.

4. Apparatus according to claim 2; wherein in said normal reproduction mode of said video tape recorder, said digital television signal is read from said first field store while being written into said second and third field stores, and is then read from said second field store while being written into said third and first field stores, the preceding sequence continuing cyclically.

5. Apparatus according to claim 2; wherein in said slow motion reproduction modes of said video tape recorder, said digital television signal is repeatedly read from said first field store while being written into said second field store and then into said third field store, and is then repeatedly read from said second field store while being written into said third field store and then into said first field store, the preceding sequence continuing cyclically.

6. Apparatus according to claim 2; wherein in said fast motion reproduction modes of said video tape recorder, said digital television signal is read from said first and second field stores while being written into said third field store, and is then read from said second and third field stores while being written into said first field store, the preceding sequence continuing cyclically.

7. Apparatus according to claim 1; and further comprising means for effecting vertical parity correction in said field store arrangement.

8. Apparatus according to claim 1; and further comprising means for effecting time-base correction on the read-out from said field store arrangement.

9. Apparatus according to claim 1; and further comprising means for effecting de-shuffling on the read-out from said field store arrangement.

10. Apparatus according to claim 1; and further comprising means for effecting concealment on the read-out from said field store arrangement.

11. Apparatus according to claim 1; wherein said field store arrangement comprises more than three field stores.

* * * * *

UNITED STATES PATENT OFFICE
CERTIFICATE OF CORRECTION

Patent No. 4,558,377      Dated December 10, 1985

Inventor(s) Mark C. Collins and John G.S. Ive

It is certified that error appears in the above-identified patent and that said Letters Patent are hereby corrected as shown below:

Column 8, line 25, change "algorithns" to --algorithms--;
            line 27, after "some" insert --small--;

Column 9, line 1, change "for reading" to --means for reading said stored digital television--.

Signed and Sealed this

Twenty-eighth Day of April, 1987

Attest:

DONALD J. QUIGG

*Attesting Officer*      *Commissioner of Patents and Trademarks*